May 7, 1963 J. W. HORNER 3,088,406
QUANTIZED IMPULSE ROCKET
Filed June 22, 1959 3 Sheets-Sheet 1
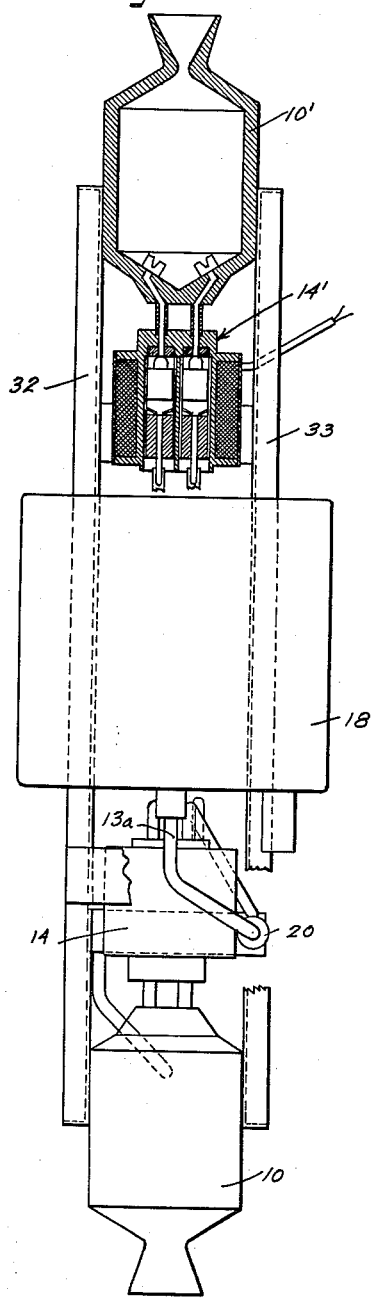
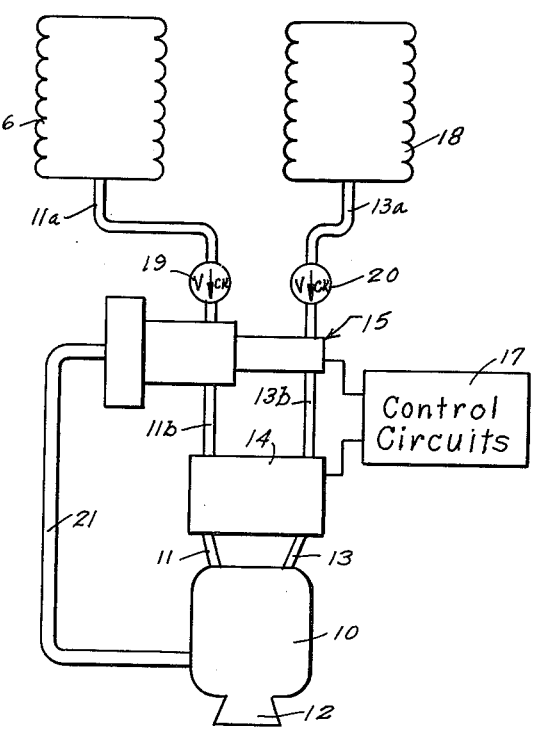
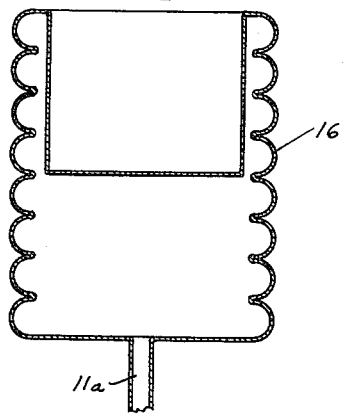
INVENTOR
John W. Horner
BY
Hill, Sherman, Meroni, Gross & Simpson
ATTORNEYS May 7, 1963
J. W. HORNER
3,088,406
QUANTIZED IMPULSE ROCKET
Filed June 22, 1959
3 Sheets-Sheet 2
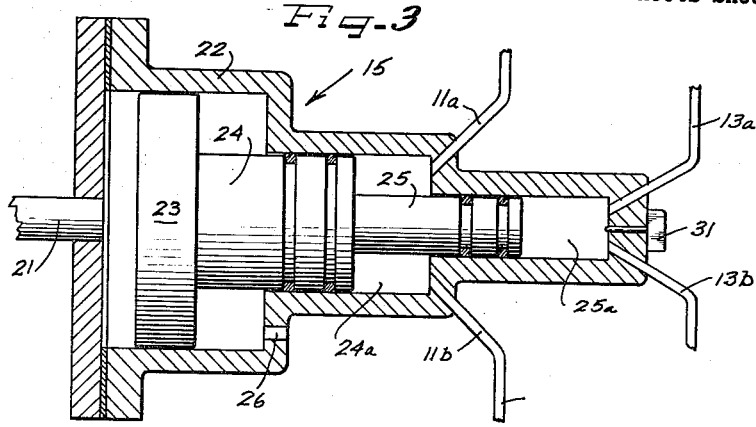
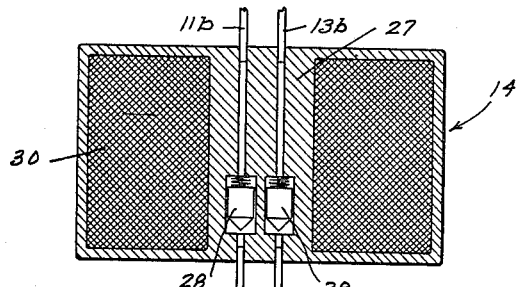
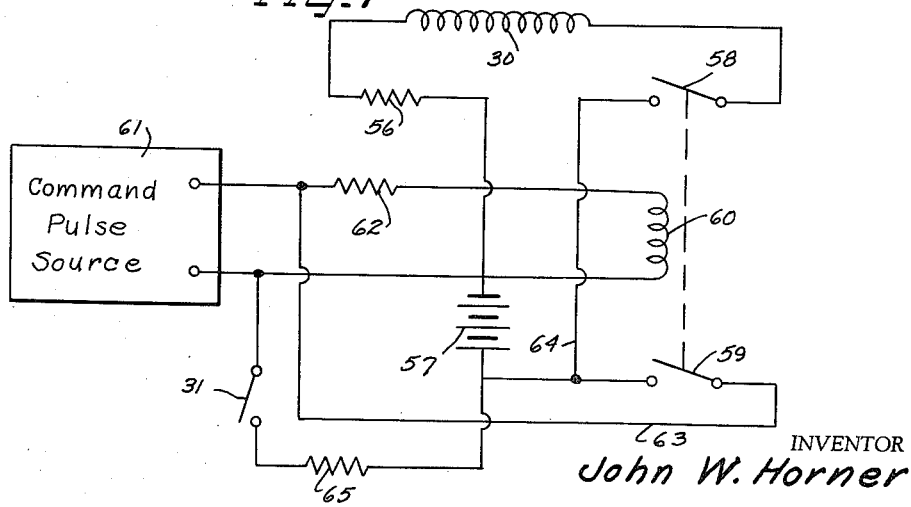
INVENTOR
John W. Horner
BY
Hill, Sherman, Meroni, Gross & Simpson
ATTORNEYS May 7, 1963
J. W. HORNER
3,088,406
QUANTIZED IMPULSE ROCKET
Filed June 22, 1959
3 Sheets-Sheet 3
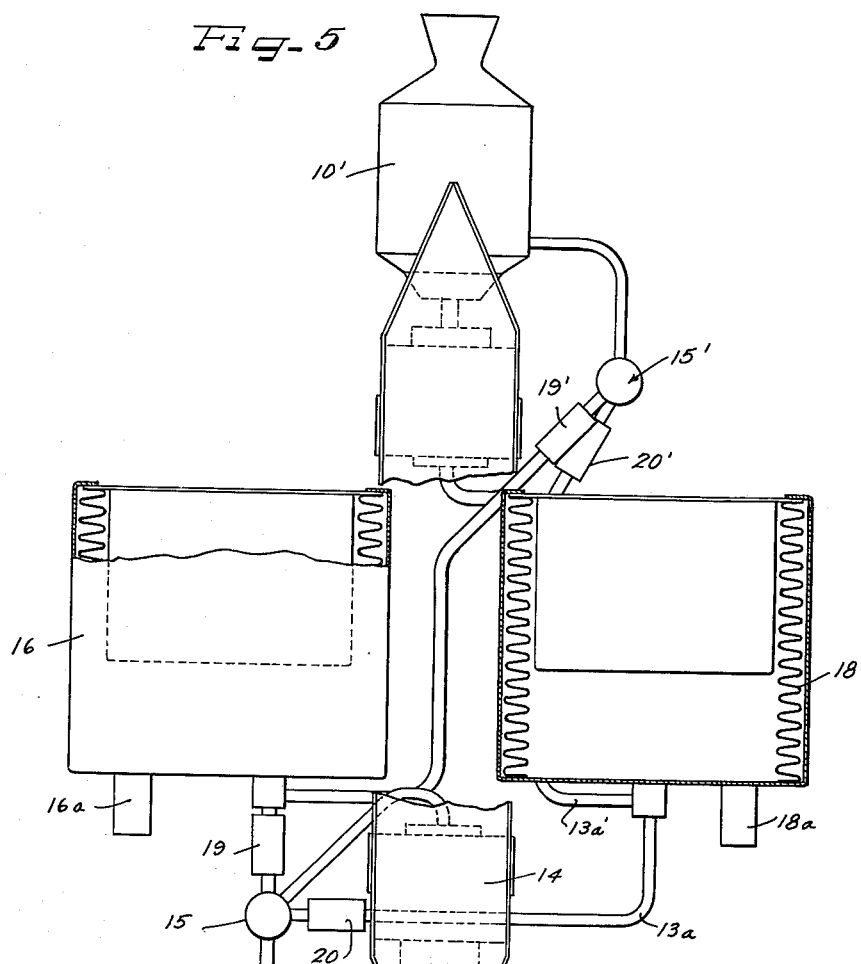
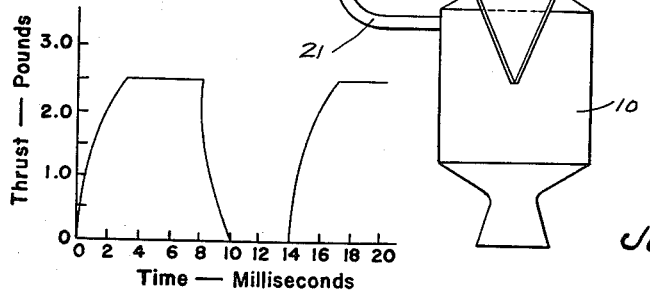
INVENTOR
John W. Horner
BY
Hill, Sherman, Meroni, Gross & Simpson
ATTORNEYS

United States Patent Office 3,088,406
Patented May 7, 1963

3,088,406
QUANTIZED IMPULSE ROCKET
John W. Horner, Whittier, Calif., assignor to Thompson Ramo Wooldridge Inc., Cleveland, Ohio, a corporation of Ohio
Filed June 22, 1959, Ser. No. 822,164
6 Claims. (Cl. 102—49)

This invention relates to an impulse rocket for attitude control systems of orbiting vehicles, satellites, missiles, aircraft, space craft, and the like. More generally, the present invention relates to improved apparatus for producing and delivering an accurately measured quantum of impulse or thrust per predetermined time interval on receipt of a single command signal and in cyclic and repetitive fashion if desired. The apparatus is adapted to produce a quantized or digitized predetermined amount of impulse for each command signal or pulse received and is particularly adapted for use in the control and orientation of any vehicle which operates in a force free field such as orbiting space vehicles or satellites or other vehicles for the movement of men and equipment in a force free field. It will, however, be understood that the apparatus may be used in conjunction with any type of aircraft or in any application where it is desired to produce thrust or impulse controllably in a quantized or digitized fashion.

In attempting to apply conventional rocket motors to attitude control systems for space vehicles, one encounters the fact that rockets all must have a minimum pressure for steady state operation. That is to say, they have a threshold pressure. When they are turned on and off in the conventional manner they incur transient tolerances which cannot be duplicated since the quantity of fuel permitted to flow to the rocket cannot normally be exactly measured. Naturally, these tolerances are all reflected in the movement of the vehicle and must be corrected out by the expenditure of excessive propellant only after undesired vehicle perturbations have resulted. Consequently, other methods of achieving attitude control for space vehicles have been considered. Such methods include the use of cold gas contained in high pressure tanks which is ejected through reaction nozzles as needed and the use of hot gas generated in a central source by chemicals and likewise ejected through reaction nozzles as needed. Each of these methods, however, requires apparatus which is heavy, bulky, and definitely limited in duration of application. For example, such cold or hot gas systems may be used for a vehicle with a 24 hour life expectancy, but are not suitable to vehicles having a life expectancy of a week or a month.

On the other hand, as noted above, the present state of the art of liquid rocket engines also exhibits marked deficiencies when considered from the standpoint of efficiency and reliability in control applications. The degree of dependability of a propulsion system is in general a function of several factors including the power controls which encompass propellant ignition, regulation during the thrust increase to the rated thrust, conditions controlling malfunction probability during starting transient, some form of thrust control, and fuel-oxidizer mixture ratio or propellant utilization control. From an examination of the above factors from the point of view of individual subassemblies involved, the existing deficiencies within the art will be more apparent.

The following means are in general use to supply a flow of propellant to the injector head of the reaction motor at pressure. (1) Tanked, compressed gases which were used in the earliest missiles and still find some application. However, the high pressure tanks required with their contents will often exceed 10% of the take-off weight of the vehicle. (2) Another method makes use of a high speed, low suction pump usually having large flow rates. The driving means for the pump is either electrical, or a turbine which uses parasitic combusted products of the prime mover or an individual gas generating system. The complexities of this system are apparent from the multiplicity of mechanisms comprising the whole, each individually subject to malfunction with a resulting disablement of the entire system. This arrangement can only find justification in the largest of missiles. Further, penalties arise from the problems presented by seals and bearings that would come in contact with such fluids as liquid oxygen, fluorine or nitric acid.

Whatever the fuel feed means, there is required downstream from the fuel and oxidizer tanks and the particular propellant feed means used, a precise and necessary complicated synchronization device which must be considered an integral part of the ignition design. The ignition system used may be (1) an electrically activated solid propellant igniter (2) a generous capacity electrical spark source (3) an auto-ignitable propellant or (4) an electrically energized heating element providing abundant contact surface for fuel impingement. It is evident that in using any of the first three of these ignition means, a rigidly timed sequence of physical operations is essential to avoid dangerous propellant accumulation in the thrust chamber coincident with possible dilatory auto-ignition. Devices employed currently are susceptible to failure, often with hazardous results. The final ignition means, an electrical heating element, presents less of a problem from the point of view of accuracy of sequence timing, but does require a plentiful power supply to be efficient, and the magnitude of the power requirement is an uneconomical space and weight factor for the parent structure.

Another sub-assembly of the power control system in a liquid, bipropellant rocket engine is the mixture ratio or propellant-utilization controls. Control of propellant mixture ratio may be accomplished by calibration of the engine hydraulic systems and the empirical adjustment of system resistances. Understandably, this merely brings the ratio regulation to within a broad tolerance and offers little assurance that maximum total impulse will be assured through a simultaneous exhaustion of both propellant constituents.

An alternate arrangement for mixture ratio control is by a direct metering of both fluids. This affords a good control over obtaining total available impulse, however, actuation power levels are usually high because of the need for large propellant metering valves operating at high pressures and speed. Conjointly, the costs of this type of valve are quite high, and such valves introduce a further departure from the desired system simplicity consistent with rocket engine reliability.

Once the rocket engine has been started, there arises in certain missile applications requirements for accurate thrust level control or accurate thrust cut-off reproducibility due to the adopted guidance systems. There are two relatively convenient ways to vary the thrust magnitude. The first of these is by reducing the pressure of combustion in the rocket chamber. However, this also reduces efficiency and is not a truly attractive method. The second method is adjustment of the throat area of the thrust chamber. Thermodynamically this is a more efficient means than the preceding but often results in mechanical difficulties. It should be noted that while both of these arrangements are workable, they do impose compromises. Therefore, these attempts toward impulse variation do not enjoy a general acceptance. In practice, impulse adjustment when desired is more often accomplished by adding and subtracting chambers or by controlling time of shut off rather than by throttling.

In attitude control thrust generating apparatus of the type wherein a predetermined quantum or digitized amount of impulse is generated in response to a command signal, the recoil of a movably mounted combustion chamber may in certain applications be used as a source of force to actuate an injector to inject a predetermined amount of fuel into the combustion chamber. However, where relatively large amounts of thrust are to be generated in each cycle of operation, the necessity of increasing the thickness of the chamber walls to afford sufficient heat absorption increases the weight of the combustion chamber and produces an unfavorable thrust-weight ratio for good response in the moving chamber concept of impulse rockets.

It is therefore an object of the present invention to provide a rocket for attitude control systems wherein a predetermined quantum of impulse may be generated in response to a command signal by injecting a predetermined amount of fuel into a combustion chamber which is fixed relative to the vehicle whose attitude is to be controlled.

It is a further object of the present invention to provide such an impulse generating rocket wherein the injection of a predetermined amount of fuel into the combustion chamber is independent of the thrust generated by the rocket.

It is a still further object of this invention to provide such a quantized impulse generating rocket wherein the combustion chamber may be fabricated of any desired material or weight in order to achieve desired heat absorbing properties without affecting the efficiency of operation of the system.

Other objects, features and advantages of the present invention will be more fully apparent to those skilled in the art from the following detailed description taken in connection with the accompanying drawings, in which like reference characters refer to like parts throughout and wherein:

FIGURE 1 is a diagrammatic illustration of a single rocket engine in accordance with the present invention.

FIGURE 2 is a cross-sectional view of the fuel tank shown in FIGURE 1.

FIGURE 3 is a cross-sectional view of the injector pump shown in FIGURE 1.

FIGURE 4 is a cross-sectional view of the solenoid valve assembly shown in FIGURE 1.

FIGURE 5 is an elevational view, partially broken away, of an assembly of two rocket engines of the type shown in FIGURES 1 through 4.

FIGURE 6 is a side elevational view, also partially broken away to show portions in section, of the apparatus shown in FIGURE 5.

FIGURE 7 is a schematic circuit diagram of a control circuit suitable for use with the apparatus of the present invention.

FIGURE 8 is a graph in which time in milliseconds is plotted as abscissa against thrust in pounds as ordinant to illustrate the operating characteristics of the rocket engine.

Turning now to the drawings and in particular to FIGURE 1 thereof, there is shown an impulse rocket system suitable for attitude control applications. In practice, a vehicle to be guided is normally provided with a plurality of rockets of the type shown in FIGURE 1, each rocket affording upon command a predetermined quantum of thrust component in a single given direction or along a single axis of the vehicle. There may, for example, be a cluster of four such rockets for a particular vehicle. Often, however, desired flexibility in control applications may require the use of six or eight such rockets in a vehicle to be guided.

The individual rocket shown in FIGURE 1 includes a thrust or reaction chamber 10 in which hypergolic reaction converts fuel components into high pressure gases which are in turn converted into thrust. An exhaust discharge nozzle 12 of any suitable type commonly used in rocket motors opens into the rear or bottom end of the thrust chamber 10. A fuel line 11 and an oxidizer line pipe 13 extend from the combustion chamber 10 to a solenoid valve assembly 14 to an injector pump 15 which injects precisely measured predetermined quantities of fuel and oxidizer through lines 11 and 13 respectively from a fuel tank 16 and an oxidizer tank 18 respectively under the control of an electrical control circuit 17 in a manner to be described in detail below. At this point it should be noted, however, that the operation of each rocket is such that the injection of the predetermined amounts of fuel and oxidizer result in the generation of thrust as a function of time as indicated in the graph of FIGURE 8. That is to say, the thrust builds up rapidly from zero to a predetermined maximum value, persists for a predetermined time, and decays rapidly back again to zero until another command signal is received from the control circuit to initiate the next cycle of operation.

This mode of operation is achieved generally in the apparatus of FIGURE 1 as follows. A piston in the injector pump 15 is normally in a position so that fuel from fuel tank 16 and oxidizer from oxidizer tank 18 can flow through check valves 19 and 20 upstream of the injector pump 15 in lines 11a and 13a respectively, through the injector pump 15 and down to the dual solenoid valve assembly 14. The solenoid valve assembly 14 normally closes both lines 11 and 13. Upon receipt of a command signal from the control circuit 17, the solenoid valve assembly 14 is opened and fuel from fuel tank 16 and oxidizer from oxidizer tank 18 flows under low pressure from these tanks into the combustion chamber 10. The hypergolic reaction of the fuel and the oxidizer in the combustion chamber 10 begins to generate thrust and rapidly increases the pressure in the combustion chamber 10. A conduit or line 21 connects the combustion chamber 10 to the rearward side of a piston in the injector pump 15 in a manner to be described in detail below. As the pressure in the combustion chamber 10 builds up along the leading edge of the pulse wave form shown in FIGURE 8, this pressure rapidly drives an injector piston in the pump 15 to a position such that the entire amount of predetermined quantities of fuel and oxidizer stored in the injector pump cylinder is injected into the combustion chamber 10. Upon completion of the stroke of this piston a limit switch or other suitable device in the injector pump is actuated which through the control circuits 17 again closes the solenoid valve assembly 14. The low pressure fuel and oxidizer from tanks 16 and 18 then acts to return the piston in the injector pump 15 to its original position thereby again filling the injector pump cavities or cylinders with fuel and oxidizer to be injected in the next stroke on receipt of the next command pulse. If desired, the conduit 21 can be omitted and the injector piston of injector pump 15 can be operated in both directions by valving low pressure gas from the propellant tanks such as the fuel tank 16. The arrangement shown in FIGURE 1 is, however, the preferred arrangement.

The impulse rocket system shown in FIGURE 1 embodies a propellant injection system which eliminates the start and stop tolerances normally associated with a rocket thrust chamber. It offers a feasible solution to attitude control for vehicles which must operate for a duration of weeks and months unattended. It also is characterized by a minimum of operating difficulties, a wide temperature range capability, and great growth potential. The system features a precisely measured increment of impulse which is achieved by injecting fuel and oxidizer to the thrust chamber by the action of the injector pump. The propellant used in the system may, for example, be red fuming nitric acid and mixed hydrazines in a 1.83 to 1 weight ratio. These particular propellants have an extremely energetic hypergolic reaction, a low freezing point ($-165°$ F. and $-85°$ F. respectively), a high specific impulse, and have shown a very favorable performance in laboratory tests. In a system wherein four such rockets are grouped in a cluster, 40 lb.-seconds of impulse for each thrust cluster may be supplied from 0.20 lb. of liquid propellants. In each thrust cycle 0.020 lb.-second of impulse can be delivered at a peak of 2.5 lb. thrust. A cycle may be repeated every 14 milliseconds.

In applications where it is desired that there be no heat rejection from the thrust chambers, the chamber walls may be made sufficiently thick to absorb all heat from 0.20 lb. of propellant and yet not to exceed 1000° F. temperature rise. These thick walls of the chamber 10 are sufficiently heavy to preclude the efficient use of a moving or recoil operated thrust chamber. The injection system to be described in detail below is thus adapted to be used with a fixed heavy weight chamber 10.

In practice an attitude control system may be composed of two completely independent thrust chamber clusters. Each cluster utilizes two thrust chambers diametrically opposed to each other in position as seen in FIGURES 5 and 6. The operation of one thrust chamber will be described since it is typical of all four thrust chambers.

Equal volumes of fuel and oxidizer are contained in the bellows type tanks 16 and 18 which are shown in greater detail in the cross-sectional view of FIGURE 2. The spring rate of the bellows shown may conveniently be adjusted to provide expulsion pressures ranging from 100 to 50 lbs. per square inch as the liquids are expelled and consumed.

The details of the injector pump 15 are seen more clearly in the sectional view in FIGURE 3.

In FIGURE 3 there is shown a cross-sectional view of the injector pump 15. It will be noted that the pump housing 22 encloses three stepped pistons on a single shaft. Piston 23 is the driver receiving high pressure gases from the thrust chamber 10 through conduit 21. Piston 24 is the fuel injector and piston 25 is the oxidizer injector. The areas of the pistons are arranged to give, for example, 360 lbs. per square inch injection pressure at 300 lbs. per square inch thrust chamber pressure. The conduit 11a from the fuel tank and the conduit 11b to the thrust chamber both open into the bore 24a of the cylinder housing the piston 24. Similarly, the conduit 13a from the oxidizer tank and the conduit 13b leading to the thrust chamber both open into the bore 25b of the cylinder housing the piston 25. Since the fuel and oxidizer pressures are at all times equal, there will be no leakage of the oxidizer. A vent port 26 may conveniently be provided to accommodate fuel and driving gas leakage.

The details of the solenoid assembly 14 are shown in the sectional view of FIGURE 4. It will be noted that the conduits 11b and 13b are connected to a common housing 27 and lead to separate chambers therein each containing a solenoid plunger 28 and 29 respectively. The plungers 28 and 29 are spring and/or gravity biased to a closed position and are adapted to be lifted to the position shown in FIGURE 4 so as to open the chamber to flow from conduit 11b through to conduit 11 and from conduit 13b through to conduit 13 when the solenoid coil 30 is actuated by an appropriate electrical current.

An impulse cycle is started by the solenoid shut-off valves 28 and 29. As has been seen, the two coaxial valves are contained in the same magnetic core. An electrical signal simultaneously lifts each valve from its seat permitting propellant to flow to the thrust chamber under low pressure.

Note that the propellant flow is increased to full flow by "boot strapping" the reaction gases to the injector gas piston. That is to say, the gases initially flow under relatively low pressure from the tanks and as pressure builds up in the combustion chamber it is applied through conduit 21 to the driver piston 23 which actuates the injector pump and forces the fuel piston 24 and oxidizer piston 25 fully to the right as seen in FIGURE 3. When the stroke of the pistons have been completed they may conveniently trip a microswitch or limit switch 31 which is mounted in the casing of the injector pump and is connected in the control circuit in such a fashion as to again close the solenoid valves. In a typical exemplary embodiment the injector piston may move through a 0.117 inch stroke. On each cycle, $8 \times 10^{-5}$ lbs. of propellant is delivered to the thrust chamber. The check valves 19 and 20 in the propellant lines to the storage tanks prevent flow back to the tanks during the injection part of the cycle.

The thrust chamber in a typical preferred embodiment may have a generally cylindrical shape with an inner diameter of approximately 0.9 inch and an axial length of approximately 1½ inches. It may suitably have side walls of stainless steel approximately 0.21 inch thick. Such a chamber has a volume of approximately 0.97 cubic inch. Conveniently, the conduits 11 and 13 may enter the thrust chamber through a lava insert against which injectors are mounted in a manner well-known in the art. Propellants from the solenoid valve flow to each injector. The impinging spray patterns immediately start a reaction in the chamber. Heat rejected to the chamber walls is absorbed by the heavy metal. This is possible since the reaction is cyclic, and there is sufficient time for the heat to distribute. The injectors and the solenoid valves are protected from heating by the lava insert and by an insulating gasket which may surround the top wall of the combustion chamber.

In FIGURES 5 and 6, there is illustrated the manner in which two such thrust producing rockets may be assembled in a cluster, the two rockets of the cluster being directed in diametrically opposite directions 180° away from each other along the same straight axial direction. In FIGURES 5 and 6 the first reaction chamber 10 and its associated components are identified by the same reference characters which have previously been used in describing the other figures of the drawing. The diametrically opposed reaction chamber is indicated by the reference character 10' and its associated components are similarly indicated by corresponding reference characters with the prime added. It will be noted, however, that the two rockets of the assembly are connected to be supplied from common fuel and oxidizer tanks 16 and 18. These in practice may be provided with fill valves 16a and 18a respectively. The two reaction chambers 10 and 10' may be mounted between frame-worked members 32 and 33 which support the associated components in the manner illustrated in FIGURES 5 and 6.

In FIGURE 7 there is shown a more detailed circuit diagram of the control circuit 17 of FIGURE 1. In FIGURE 7 it will be noted that the actuating solenoid coil 30 of the normally closed valves 28 and 29 is connected in series with a current limiting resistance 56 across the positive and negative terminals of a battery 57 through a circuit which includes a normally open spring biased relay switch 58. Switch 58 is mechanically ganged to a second switch 59 which is also spring biased to a normally open position and both of these switches are adapted to be closed by energization of a relay coil 60 upon receipt of a command pulse or signal either remotely by radial communication or directly from a local guidance system. It will be noted that the command pulse source 61 is directly connected in series with the solenoid 60 through a circuit including a current limiting resistor 62. When a command pulse from source 61 is applied to relay 60 through resistor 62, the switches 58 and 59 are both closed. Closing of switch 59 completes a holding circuit through conductor 63, resistor 62, solenoid coil 60, and the battery or other power source 57 which acts as a holding circuit to maintain the switches 58 and 59 in a closed position during the stroke of the piston in order that the solenoid 30 may be energized to hold the valves 28 and 29 open. Closing of switch 58, of course, completes the circuit from battery 57 through conductor 64, switch 58, solenoid coil 30, and resistor 56 back to the other side of the battery. Energization of the coil 30 actuates the valves to the position shown in FIGURE 4.

Thus, upon receiving an electrical signal from the guidance or control system, the simultaneous actuation to an open position of the fuel and oxidizer shut-off valves takes place. This results in a simultaneous introduction of both propellant constituents into the reaction chamber 10, thereby instituting hypergolic ignition of the propellant constituents in the reaction chamber, the pressure developed in the chamber is communicated through conduit 21 to the driving piston 23. Such an arrangement is more particularly suited to operation with essentially analog guidance or control systems in which magnitudes of the desired amount of attitude control are represented by the duration of an electrical signal. A similar repetitive mode of operation can also be achieved by providing in the command pulse source 61 shown in FIGURE 7 a pulse generator which continuously emits pulses under the control of a continuing signal until the attitude of the vehicle has been adjusted to that called for by the guidance system at which time the guidance signal shuts off the pulse generator. This arrangement has the advantage shared by the rest of the circuitry shown in FIGURE 7 that no power is consumed during stand-by intervals when the rocket motor is not being actuated.

While electromechanical control circuitry has been shown by way of example in FIGURE 7, it will, of course, be apparent to those skilled in the art that equivalent electronic logic or control circuitry could readily be used if desired.

While a particular exemplary embodiment of the invention has now been described in detail above, it will be apparent to those skilled in the art that modifications and variations therein may be effected without departing from the spirit and scope of the novel concepts of the present invention as defined by the following claims.

This application is a continuation-in-part of my copending application Serial No. 759,519 filed September 8, 1958, and entitled "Impulse Rocket for Attitude Control," now Patent No. 3,048,969.

I claim as my invention:

1. A rocket for producing a predetermined quantum of impulse in response to a control signal comprising, a reaction chamber, a nozzle connected to discharge gases generated by hypergolic reaction in said reaction chamber to produce thrust, first and second low pressure fuel storage tanks for storage of first and second fuel components of said hypergolic reaction, first and second conduits connecting said first and second tanks respectively to said reaction chamber, a normally closed solenoid actuated shut-off valve in each of said conduits to normally prevent flow of said fuel components to said reaction chamber, an injector pump upstream of said solenoid valve in each of said conduits, a check valve upstream of said injector pump in each of said conduits, said injector pump having a piston therein which is urged toward a first normally open position by said low pressure fuel components from said storage tank, means to apply pressure developed in said reaction chamber to urge said piston to a second closed position in which a predetermined measured amount of said fuel components is forced out of said injector pump and into said reaction chamber, signal responsive circuit means connected to actuate said solenoid shut-off valve to an open position to initiate flow of said fuel components to said reaction chamber whereby hypergolic reaction is initiated and the pressure built up in said chamber acts on said piston to inject a predetermined amount of fuel components to said chamber, and means operatively connected to de-energize said solenoid and close said shut-off valves at the completion of the stroke of said piston in said injector pump.

2. A reaction motor to produce the same predetermined quantum of impulse in response to each received control signal comprising:
a thrust producing reaction chamber,
nozzle means communicating with the chamber for discharge of gases generated by hypergolic reaction of a fuel and oxidizer in said reaction chamber,
an injector fuel pump having a housing,
said housing defining fuel and oxidizer measuring cavities in the fuel pump,
a first pump piston in said fuel measuring cavity,
a second pump piston in said oxidizer measuring cavity,
means coaxially mounting said first and second pistons for simultaneous reciprocable motion in said measuring cavities,
one-way feed inlets to each of said cavities,
means to supply a fuel under low pressure to said fuel cavity through its inlet,
means to supply an oxidizer hypergolically reactive with said fuel to said oxidizer cavity through its inlet,
a normally closed outlet passage for each of said cavities to said reaction chamber,
signal responsive means to open each of the said outlet passages to flow of fuel and oxidizer from said cavities to the reaction chamber,
said first and second pump pistons being operatively responsive to actuation of said signal responsive means for injecting fuel and oxidizer through the open outlet passages into said reaction chamber,
and trip means in one of said cavities and normally separated from said pistons but responsive to the position of one pump piston after injection of the fuel and oxidizer into the reaction chamber to reclose said outlet passages from said measuring cavities to said reaction chamber and thus stop operation of the motor until and unless said signal responsive means functions to reopen said outlet passages.

3. In combination,
first and second reaction motors adapted for producing the same predetermined quantum of thrust impulse in response to each received control signal,
each of said motors including thrust producing means to discharge gases generated by hypergolic reaction of a fuel and oxidizer in a reaction chamber,
said motors being fixedly mounted in diametrically opposed relation so that gases from said motors are discharged in directions which are respectively 180° apart,
a pressurized fuel storage tank,
a pressurized oxidizer storage tank,
conduit means connecting each of said storage tanks to each of said reaction chambers,
first injector means interposed in the conduit means to the reaction chamber of said first motor having a piston means with a return stroke for receiving a predetermined amount of fuel and oxygen from said storage tanks and a thrust stroke for delivering the received fuel and oxygen to said first motor,
second injector means interposed in the conduit means to the reaction chamber of the second motor having a piston means with a return stroke for receiving a predetermined amount of fuel and oxygen from said storage tanks and a thrust stroke for delivering the received fuel and oxygen to said second motor,
a piston pressure source,
means connecting each piston means with the pressure source to effect the thrust stroke thereof,
signal responsive means for each of said motors for simultaneously initiating flow of fuel and oxidizer from said storage tanks selectively to one of said reaction chambers,
said injector means being operatively responsive to each actuation of said signal responsive means for injecting only a predetermined quantity of fuel and oxidizer into the reaction chamber, and control switch means tripped by the injector means for terminating flow of the fuel and oxidizer to said reaction chamber when said predetermined quantities of the fuel and oxidizer have been injected into the reaction chamber and thus stop operation of the motor until and unless said signal responsive means functions to initiate flow of fuel and oxidizer.

4. An impulse rocket for producing the same predetermined quantum of impulse in response to each control signal received thereby which comprises,
  a casing defining a reaction chamber having an exhaust nozzle at one end thereof and first and second fuel inlets at the other end thereof,
  first and second fuel tanks respectively supplying said first and second fuel inlets,
  valves controlling flow from said tanks to said inlets,
  signal responsive means for opening said valves,
  command pulse means controlling said signal responsive means,
  a piston pump having a housing,
  said housing defining first and second chambers with first and second piston portions slidable in said chambers on thrust and return strokes,
  said first and second chambers communicating with said first and second fuel tanks respectively to receive fuel therefrom on the return stroke of said piston portions,
  means connecting said first and second pump chambers with said valves to deliver fuel to and past the open valves on the thrust stroke of said piston portions,
  and switch means located in one of said chambers separated from the piston portion therein on the return stroke of the piston portion and disposed to be actuated by said one chamber piston portion for closing said valves when this piston portion reaches the end of its thrust stroke and thus stop operation of the motor until and unless said signal responsive means functions to reopen said valves,
whereby the same predetermined charges of fuel are fed to said inlets for producing a predetermined quantum of thrust at said nozzle and each successive impulse from said command pulse means will selectively produce successive predetermined quantums of thrust.

5. In an impulse reaction motor,
  a reaction chamber having fuel inlet means and thrust gas discharge means,
  signal responsive control means to initiate flow of gas generants to said fuel inlet means,
  a source of gas generant,
  piston injector means communicating with said source of gas generants and with said fuel inlet means,
  said piston injector means having a return stroke to receive gas generants from said source and a thrust stroke to deliver the received gas generants to said fuel inlet means,
  a piston pressure source,
    means connecting each piston means with the pressure source to effect the thrust stroke thereof,
  said piston injector means on the thrust stroke thereof delivering only a predetermined total quantity of gas generants to said fuel inlet means for developing a predetermined thrust in said thrust gas outlet of said generator,
  and means comprising a switch member separated from said piston injector means during the return stroke thereof and disposed to be actuated by said piston injector means at the completion of each thrust stroke thereof to terminate flow of said gas generants to said fuel inlet means and thus stop operation of the motor until and unless said signal responsive means function to again initiate flow of gas generants to said fuel inlet means,
whereby said reaction motor will deliver only a predetermined quantum of thrust in response to a signal actuating said signal responsive control means.

6. A rocket motor which comprises means defining a combustion chamber having a thrust gas discharge nozzle at one end and fuel inlet means at the other end,
  a fuel source,
    conduit means connecting the fuel source with the fuel inlet means,
  signal responsive valve means controlling flow through said conduit means,
  a fuel injector in said conduit means having a piston means with a return stroke for receiving a predetermined amount of fuel from said source and a thrust stroke for delivering the received fuel to said valve means,
  means connecting said piston means with the interior of said combustion chamber for delivering combustion chamber pressure to the piston means to effect the thrust stroke thereof,
  and switch means separated from the piston means during the return stroke and disposed to be engaged and tripped by the piston means at the completion of the thrust stroke thereof for closing said valve means and thus stop operation of the motor until said signal responsive valve means functions to open said valve means,
whereby a signal input to said valve means will effect delivery of only a single charge of fuel to said fuel inlet means to thereby produce a predetermined quantum of thrust in response to the signal.

References Cited in the file of this patent
UNITED STATES PATENTS

| | | |
|---|---|---|
| 1,052,588 | Janicki | Feb. 11, 1913 |
| 2,395,435 | Thompson et al. | Feb. 26, 1946 |
| 2,536,597 | Goddard | Jan. 2, 1951 |
| 2,566,436 | Waite | Sept. 4, 1951 |
| 2,613,497 | MacDonald | Oct. 14, 1952 |
| 2,671,312 | Roy | Mar. 9, 1954 |
| 2,726,510 | Goddard | Dec. 13, 1955 |
| 2,771,739 | Malina | Nov. 27, 1956 |
| 2,779,158 | Dungan | Jan. 29, 1957 |
| 2,979,891 | Widell | Apr. 18, 1961 |